United States Patent [19]

Mack et al.

[11] Patent Number: 4,848,632
[45] Date of Patent: Jul. 18, 1989

[54] METHOD FOR GUIDING A MOVING WEB OF MATERIAL

[75] Inventors: Horst Mack; Klaus Scharm, both of Augsburg, Fed. Rep. of Germany

[73] Assignee: Erhardt & Leimer GmbH, Augsburg, Fed. Rep. of Germany

[21] Appl. No.: 46,844

[22] Filed: May 4, 1987

[30] Foreign Application Priority Data

May 2, 1986 [DE] Fed. Rep. of Germany ....... 3614981

[51] Int. Cl.⁴ .................................................... B65H 23/02
[52] U.S. Cl. ..................................... 226/18; 226/20; 226/21
[58] Field of Search .................... 226/2, 3, 15, 18–21

[56] References Cited

U.S. PATENT DOCUMENTS

| | | | |
|---|---|---|---|
| 2,961,548 | 11/1960 | Prell | 226/20 X |
| 3,567,091 | 3/1971 | Woolard | 226/18 |
| 3,682,362 | 8/1972 | Ott, Jr. | 226/21 |
| 3,752,377 | 8/1973 | Knapp | 226/3 X |
| 4,135,664 | 1/1979 | Resh | 226/3 X |
| 4,470,555 | 9/1984 | Lawson | 226/19 X |

Primary Examiner—Stuart S. Levy
Assistant Examiner—Katherine Matecki
Attorney, Agent, or Firm—Collard, Roe & Galgano

[57] ABSTRACT

The invention relates to a method of guiding a web of paper or foil material in a web-guiding device, such web having print marks applied to it at least over stretches of the web, as well as to such a web-guiding device with a correcting device, the latter being adjustable when the center of the web runs off course and with a controlling system connected to an edge-sensing system, whereby the position of the print marks relative to an imaginary guide line is controllable over stretches of the web carrying print marks, and additional correction relating to the latter can be made, if required. According to the invention, print marks signals are produced by means of a print mark sensor and linked with the correction signals of the edge-sensing system, with priority of the print mark signals.

6 Claims, 1 Drawing Sheet

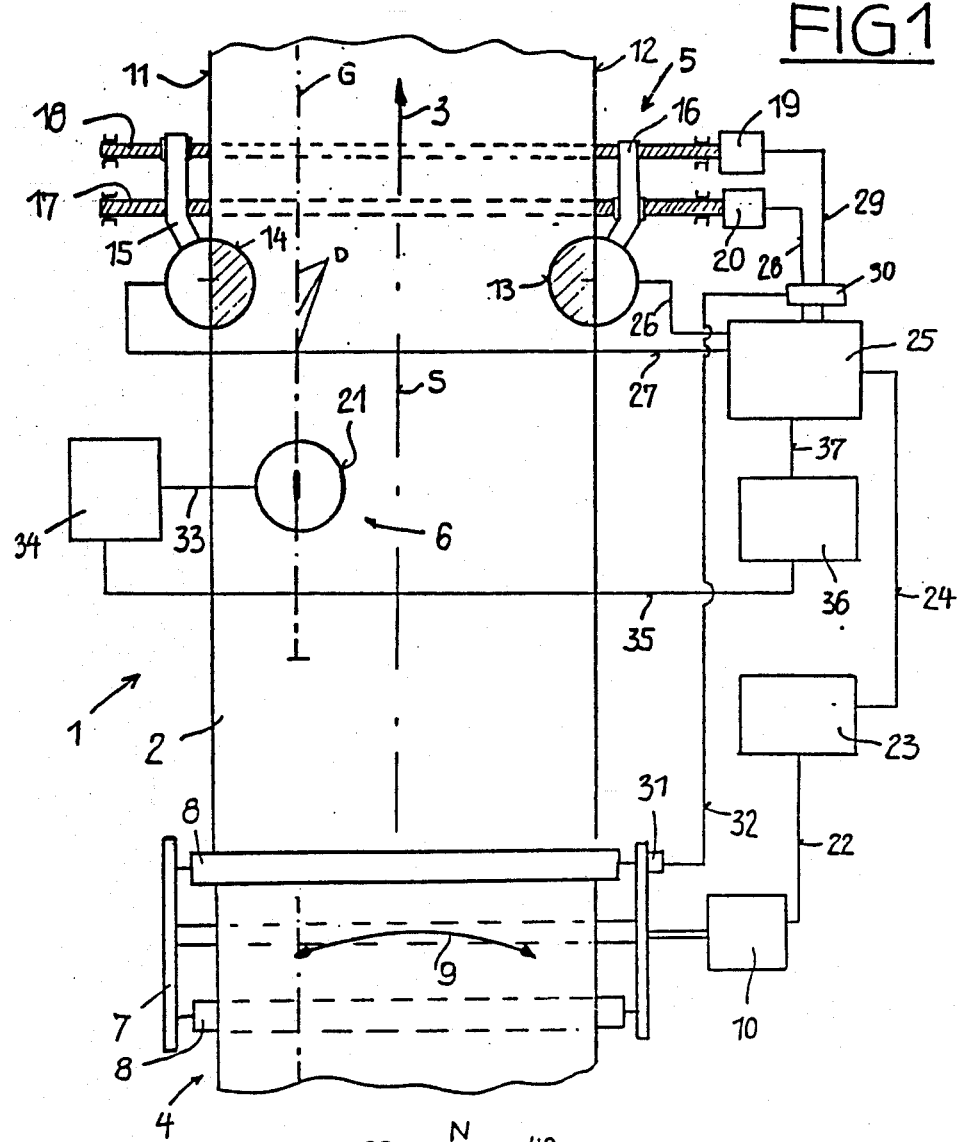
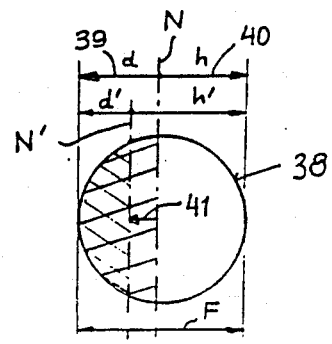
FIG 1
FIG 2

METHOD FOR GUIDING A MOVING WEB OF MATERIAL

BACKGROUND OF THE INVENTION

The invention relates to a method and an apparatus for guiding a moving web of material. More particularly, it relates to such a method and apparatus for guiding a moving web of material having print marks at least over stretches of the web, in particular, a paper web or web of foil material, in a web-guiding device in which provision is made for an adjustable correcting device for correcting the web alignment if the center of the web runs off course relative to a nominal running line. The correcting device is connected via a controlling system to an edge-sensing system, whereby over print mark stretches of the web, the relative position of the print marks with respect to an imaginary guide line can be checked and print marks signals superimposing the correcting signals of the edge-sensing system can be entered in the controlling system for additional correction, if required.

Normally, webs of paper or foil material having print marks over at least stretches of the web are controlled with respect to the center of the material web by means of an edge-sensing system (see, e.g., U.S. Pat. No. 4,485,982). However, unpredictable influences such as temperature and moisture or a general shrinking of the web of material lead to a reduction in the spacing of the print marks from the center of the web, so that with the method controlling the center by means of the edge-sensing system, the print marks no longer run in an imaginary guide line. As the print marks serve as reference marks for imprints to be applied to the web, this means that blurred print patterns are produced, which leads to web rejects. For this reason, with the known method, an operator monitors the quality of the printed pattern and interferes with the control process if the printed pattern starts to become blurred. For example, the operator enters in the control units correction pulses which are directed against the side on which the print marks run off course relative to the imaginary guide line, and the web of material is adjusted sideways via the correction system until the printed pattern is sharp again. This, however, is a highly troublesome method that requires constant monitoring by a skilled operator and, furthermore, represents an improvisation not always leading to acceptable results.

SUMMARY OF THE INVENTION

Accordingly, it is an object of the invention of providing an improved method of the type specified above in that a web of paper or foil material provided with print marks at least over stretches of the web is automatically and exactly guided with the print marks along the imaginary guide line over the stretches carrying such print marks, whereas where the application of print marks is interrupted, such web is exactly controlled relative to the center of the web.

It is a further object of the invention to provide an automatically controlling device for such a method.

According to the invention, this object is achieved by the provision of a method and apparatus as previously described wherein print mark signals are produced by means of a print mark sensor which signals are linked with the correction signals of the edge-sensing system with priority of the print mark signals.

By virtue of the linkage of the correction signals with priority of the print mark signals, it is possible to alternatively control the web of material following application of the print marks, and with respect to the edge or center of the web in the absence of print mark application. In this way, undesirable excessive off-course movements of the material web are reliably avoided and exact control of the material web is assured in any case. Changes in the spacing between the center of the web and the print mark application due to temperature or moisture influences will, in any case, cause the material web to be controlled based on the print marks because of the dominating print mark signals, so that a sharp print pattern is assured in the subsequent printing step. As the signals are constantly linked with one another, the presence of a print mark application always following the passage of a short stretch of web material guarantees a sharp printed pattern.

Preferably, provision is made for an edge sensor in the edge-sensing system on at least one edge of the web, such edge sensor having a sensing range of a certain width with a zero point for the correct position of the edge of the web. As soon as the controlling system detects, based on the signals received, that the edge of the web facing the edge sensor is outside the zero point while the print mark application is in the correct position relative to the print mark sensor, the zero point is caused to follow the edge of the web (i.e., it is shifted to form a new zero point position), so that the web sensor(s) will not work against the signals of the print mark sensor and influence the correcting device in any undesirable manner.

Most desirably, in the edge-sensing system, an edge sensor with a zero point is associated with each edge of the web. With this embodiment, both zero points of both edge sensors are caused to follow in the imaginary guide line in dependence upon the correct print mark position, and both are fixed in new zero point positions. The edge sensors then cooperate with the print mark sensor on the correcting device, but rather support the print mark sensor by virtue of their sensing range—which is wider as compared to the range of the print mark sensor—when greater off-course movements occur.

Most advantageously, the print mark sensor is neutralized between the print mark stretches of the web and the run of the latter is exclusively controlled by the edge-sensing system. This is important in that in the absence of print mark application, the edge-sensing system will automatically and without transition take over sole control of the run of the material web.

In another important embodiment of the method, the edge sensors of the edge-sensing system are adjusted to the edges of the web for starting the run of the web. Until now, the web edge sensor had to be adjusted to the edges of the web by hand if the web started to run slowly. This was troublesome and timeconsuming work. In the present case, the print mark sensor is neutralized or deactivated for the start-up and the adjusting drive of the correcting device is locked. The two edge sensors are automatically adjusted with their zero points to the edges of the web via the controlling device by means of separate adjusting drives, and substantially, the adjusting drives are released, the print mark sensor is activated and the adjusting drive of the correcting device is released. As the controlling device can be used in a simple way for controlling the separate adjusting drives of the threaded adjusting spindles, the web edge sensors can be quickly and exactly adjusted to the edges of the web by way of the controlling device as the web is still slowly starting to run. However, both the correcting device and the print mark sensor remain inactive, so that the edge sensors can immediately move into their correct positions without any interference.

In addition, the locking of the adjusting drives for the edge-sensor adjustment and the unlocking of the adjusting drive of the correcting device preferably takes place automatically and in dependence on reaching a predetermined running speed of the web. This is important in that when the web has reached its normal operating speed, the edge sensors are adjusted to their correct positions and control by means of the correcting device starts practically without transition.

Certain of the foregoing and related objects are also achieved, according to the invention, by the provision of a device for carrying out the method which includes a rotary frame which is adjustable by means of an adjusting drive, the latter being connected via an electronic control part to a signal evaluator associated with at least one edge sensor for the position of the center of the web in the nominal running line, and, for which rotary frame, provision is made for a control unit for correcting the print marks to the imaginary guide line, such control unit being connected in parallel with the signal evaluator. A print mark sensor is arranged within the width of the web and generates print mark signals as long as the print marks do not exactly run in the imaginary guide line and transmits such signals via the signal evaluation circuit to the controlling unit, which simultaneously acts on the correcting device and the edge-sensing system.

Preferably, the edge-sensing system contains an optical edge sensor on each edge of the web, such edge sensor working within a predetermined sensing range for the off-course movement of the edge of the web, and with a zero point for the correct position of the edge of the web. The zero point of each edge sensor can be steplessly shifted electronically within the sensing range and the controller is connected to the electronic zero-point adjustment of each edge sensor. With this embodiment, in which the zero point of each edge sensor is displaceable electronically, the print mark sensor, by means of its dominating signals, causes the zero point of each edge sensor to follow the edge of the web until the edges of the web, too, are disposed correct with respect to the edge sensors, with the print marks being in their correct position. In practical application, this is accomplished as follows: If the print marks run off course relative to the imaginary guide line, the correction signals of the print mark sensor influence the correcting device until the latter had displaced the material web to such an extent that the print marks will run in the imaginary guide line. Subsequently, if it is detected by the controlling device that one or both edge sensor(s) is/are not aligned with its/their zero point(s) with the edge of the web, the zero point(s) is/are displaced until conforming with the edges of the web. In this way, the center of the web is quasi displaced towards the one or other side in dependence on the imaginary guide line and on the conformity of the print marks with such imaginary guide line.

Most desirably, the edge sensors are supported on two separate threaded adjusting spindles and are adjustable crosswise relative to the running direction of the web, with both adjusting spindles having automatically controllable adjusting drives. As a result, the two edge sensors can be individually and quickly adjusted on the two separate threaded adjusting spindles until they are set in the correct position.

In a further preferred and, constructionally speaking, simple embodiment, the threaded adjusting spindles are disposed parallel with one another and with a spacing inbetween, and each edge sensor is seated on a holder threadably mounted on a threaded adjusting spindle and slidably supported on the other threaded adjusting spindle. Consequently, each threaded spindle has a dual function in that it is responsible, on the one hand, for the adjusting movement of the associated holder of an edge sensor, and at the same time for guiding the other holder, on the other hand.

It is also particularly useful if the edge sensors are optical reflection sensors operating based on the light-/dark-principle with measurement of the amount of light, so as to produce their correction signals in dependence on the extent and direction of the off-course run of the edges. Such modern optical reflection sensors work with high accuracy and their sensing range is relatively wide; furthermore, they have an exact zero point that can be displaced or adjusted electronically without any problems. The signals of the edge sensors exactly indicate the extent and direction of the off-course movement of the edge of the web, so that the correcting device is always exactly informed about the direction in which correction movements have to be made. If provision is made for two edge sensors, their signals are added in the controlling unit and a correction signal is produced based on such added signals.

Furthermore, in practical application, it has been found that it is useful to arrange the print mark sensor ahead or upstream of the web edge sensors in the running direction of the web.

Finally, it is particularly advantageous for the adjusting drives of the threaded adjusting spindles to be connected to the center position controller and that provision be made for a speed sensor for the speed of the web, with such speed sensor being connected to a locking circuit of the adjusting drives. These features permit automatic switching from the adjustment phase to the control phase; the speed at which such switching is effected can be set depending on the type and quality of the material of the web being processed.

Other objects and features of the present invention will become apparent from the following detailed description considered in connection with the accompanying drawings, which disclose one embodiment of the invention. It is to be understood that the drawings are to be used for the purpose of illustration only, and not as a definition of the limits of the invention.

BRIEF DESCRIPTION OF THE DRAWINGS

In the drawings, wherein similar reference characters denote similar elements throughout the several views:

FIG. 1 is a schematic top view of a guiding device embodying the present invention; and FIG. 2 is a schematic diagram showing the sensing range of an edge sensor of the device according to FIG. 1.

DETAILED DESCRIPTION OF THE INVENTION

Referring now in detail to the drawing, FIG. 1 illustrates a device 1 for guiding a moving web 2 of material, for example a paper web or web of foil material, moving at a substantially constant rate in the direction indicated by the arrow 3 (i.e., the running or feed direction). The center of the web is indicated by dash-dotted lines, which center is expected to run in a nominal running line S. The print marks D are applied to the web (2) at least over stretches of the web, and such print marks are expected to run in an imaginary guide line G in order to obtain or produce a sharp printed pattern. The crosswise spacing between G and S is known and assumed to be a given quantity for the control. However, the temperature, moisture or shrinkage of the web has adverse effects in that such spacing can change in unpredictable ways, so that the basic adjustment of the control is no longer correct.

Provision is made in the device for a correcting device 4 by which the moving web can be displaced towards one or the other side. In the running direction 3 of the web, an edge sensing system 5 and, furthermore, a print mark sensing system 6 are arranged following the correcting device 4. In the embodiment shown in the drawing, this correcting device 4 consists of a rotary frame 7 equipped with rolls or rollers 8. In such frame, web 2 runs partly looped around the rolls 8, which pull the web into the desired position. The rotary frame 7 is swivel-mounted and capable of swivelling or pivoting sideways in both sideways directions as indicated by the double arrow 9.

Edge sensors 13, 14 are associated with the edges 11, 12 of the web which operate according to the reflection principle and are capable of distinguishing between light and dark, using the amount of light detected in each case for producing correction signals (FIG. 2).

The one edge sensor 13 is mounted on a holder or support arm 16, whereas the other edge sensor 14 is mounted on an reversed (as a mirror image) holder or support arm 15. The two holders 15, 16 are supported on two threaded adjusting spindles 17, 18, the latter being parallel with each other, in a way such that the holder 15 can be displaced by threaded movement on the one threaded spindle 17 while sliding on the other threaded spindle 18 with support by the latter. The two threaded adjusting spindles 17, 18 each have their own jackscrew-type actuators or adjusting drive 19, 20 for displacing the holders 15, 16 and thus for adjusting the edge sensors 13, 14 with respect to the edges 11, 12 of the web.

In the print mark sensing system 6, a print mark sensor 21 is arranged within the width of the material web and aligned with the aforementioned theoretical, imaginary guide line G.

The actuator or adjusting drive 10 for the correcting device 4 is connected via a cable 22 with an electronic control unit 23 which, by way of a cable 24, is connected to a signal evaluator 25 for the center position (or edge position) of the web 2. The edge sensors 13, 14 are connected to the signal evaluator 25 as well, by way of the cables 26, 27.

From the signal evaluator 25, the cables 28 and 29 lead to the adjusting drives 19 and 20 of the threaded adjusting spindles 17, 18. A locking or clamp circuit 30 is contained in the cables 28 and 29 and connected to a speed sensor 31 on the rotary frame 7 by way of a cable 32.

For the lateral position of the print marks D, the print mark sensor 21 is connected to a signal evaluator 34 by way of a cable 33. From the signal evaluator 34, a cable 35 leads to a controller 36, which is connected to the signal evaluator 25 by way of cable 37. The controller 36 serves for emitting change signals for displacing the web sideways via the correcting device 4 and, at the same time, for displacing the zero point of each edge sensor 13, 14 whenever the edges 11, 12 of the web fail to conform with the zero points of the edge sensors 13, 14 while the print mark sensor 21 has detected or determined that two print marks are in the correct position in the imaginary guide line.

FIG. 2 shows that each edge sensor 13, 14 has a sensing range 38 with a sensing width F, with the zero point N being disposed in the center of said width. The zero point is located between a light range h and a dark range d with the edge sensor 13 of FIG. 1. If the edge 12 of the web conforms with the zero point N, the edge sensor 13 determines a certain amount of light at which it "knows" the edge 12 to be exactly in the zero point. If the edge 12 of the web migrates in the direction indicated by the arrow (39), the dark range is reduced while the amount of light absorbed increases. The correction signal resulting therefrom is added in the signal evaluator 25 with the correction signal produced by the other edge sensor 14 and used for adjusting the correcting device 4 in such a way that the edge 12 or both edges 11 and 12 of the web return again to the zero point or zero points, respectively.

However, if the print mark sensor 21 detects that the print marks D run off course relative to the imaginary guide line G, it produces the aforementioned correction signals which, by way of the controller 36, are used to control the controlling system 4 with priority over the signals of the edge sensors 13, 14 in such a way that the print marks D are displaced into the imaginary guide line G. The edge sensors 13, 14 would actually countercontrol such motion of displacement; however, due to the correction signal of the print mark sensor 21, the zero point of one or the zero points of both edge sensors 13, 14 are displaced into a new zero point position, for example in the direction of arrow 41 in FIG. 2, and fixed in that new position, in which case the edge sensor, for example 13 in FIG. 2, which is adjusted accordingly, then will have a narrower dark range d' and a wider light range h' than with the zero point in the center position. However, if with the correct position of the print marks in the imaginary guide line G, the associated edge 12 of the web runs in the new zero point position N', the edge sensor 13 will not produce a correction signal, but it "knows" that it now has to take into account a new reference line for the zero point. In the same way, the zero point can be shifted also in the direction of arrow 40 and newly fixed in that position.

During start-up of the web 2, the print sensor 21 is neutralized or deactivated and the adjusting drive 10 is locked. Via the signal evaluator 25 and the released locking circuit 30, the adjusting drive 19, 20 are actuated until by means of the threaded adjusting spindles 17, 18, both edge sensors 13, 14 are exactly aligned with their zero points with the edges 11, 12 of the web. This takes place at a relative low speed, which is detected by the speed sensor 31. As soon as the edge sensors 13, 14 are aligned with their zero points with the edges 11, 12 of the web, the adjusting drives 19, 20 are locked, and if a preset speed is exceeded, the adjusting drive 10 is unlocked or rendered operable and the print mark sensor 21 is activated by means of the speed sensor 31. Thereafter, i.e., once the web 2 has reached its operating speed, the run of the web is controlled as explained in the foregoing, that is, predominantly based on the print marks D and, in the absence of such print marks over stretches of the web 2, with respect to the center of the web or edges 11, 12 of the latter.

The device of the invention is commercially available from Erhardt & Leimer GmbH of Leitershofer Strasse 80, 8900 Augsburg 1, West Germany.

While only several embodiments and examples of the present invention have been described, it is obvious that many changes and modifications may be made thereunto, without departing from the spirit and scope of the invention.

What is claimed is:

1. In a method of guiding a moving web of material having print marks disposed at least over stretches of the web in a web guiding device of the type including the steps of adjusting the direction of the web if the center of the web runs off course relative to a nominal running line using a correcting device, monitoring the location of an edge of the web using an edge-sensing means, and providing edge location signals to a control system for the correcting device, the improvement comprising the steps of monitoring the relative position of the print marks with respect to an imaginary guide line and producing print mark signals by means of a print mark sensor, and providing said print mark signals and said edge location signals of the edge sensing means to said correcting device, with said print mark signals having command priority over said edge location signals for adjusting the alignment of said web via said control system.

2. The method according to claim 1, wherein the edge-sensing means comprises at least one sensor on at least one edge of the web, said sensor having a sensing range of a certain width and a zero point, further comprising the step of shifting the zero point of the edge sensor so that the zero point is aligned with the edge of the web when the print mark sensor senses that the print marks are properly aligned with said imaginary guide line.

3. The method according to claim 2, wherein the edge sensing means comprises two sensors, each with a zero point corresponding to each edge of the web, comprising the steps of shifting both zero points of the edge sensors and arresting the same in newly fixed positions when the print mark is correctly aligned with the imaginary guide line detected by the print mark sensor.

4. The method according to claim 3, additionally including the steps of adjusting the edge sensors of the edge-sensing means into alignment with the edges of the web deactivating the print mark sensor when starting movement of the web locking a first adjusting drive of the correcting device, automatically adjusting the two edge sensors with their zero points into alignment with the edges of the web via the controlling device by means of separate second adjusting drives, and subsequently, releasing the adjusting drives, activating the print mark sensor and releasing the adjusting drive of the correcting device.

5. The method according to claim 4, additionally including the steps of locking the second adjusting drives for the edge-sensor adjustment and unlocking the first adjusting drive of the correcting device upon reaching a predetermined running speed of the web.

6. The method according to claim 1, additionally including the steps of deactivating the print mark sensor and controlling the direction of the web exclusively with the edge-sensing means between the print mark stretches of the web.

* * * * *